May 15, 1945. T. L. FAWICK 2,375,909
CLUTCH
Filed May 21, 1941 2 Sheets-Sheet 1
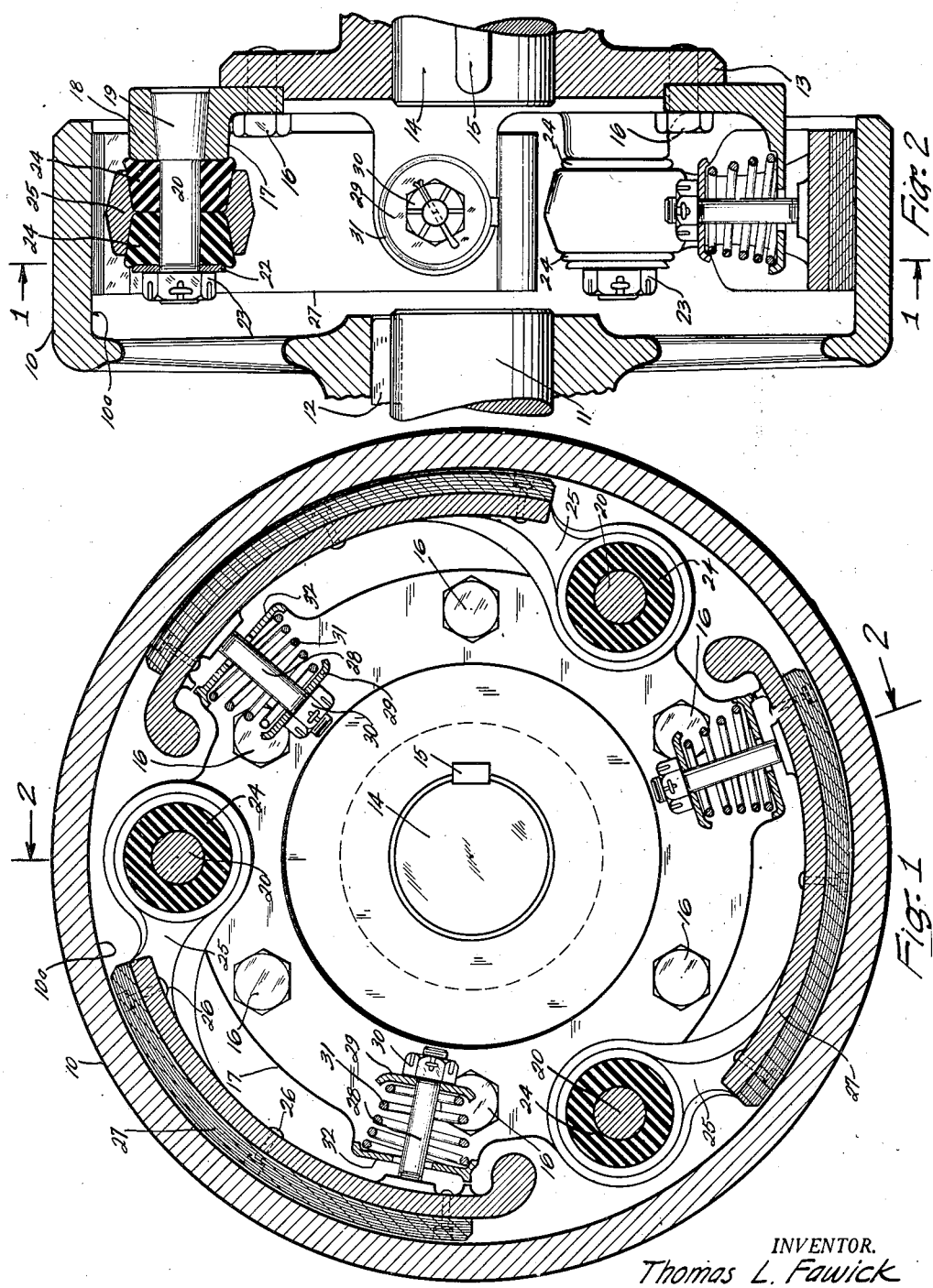
INVENTOR.
Thomas L. Fawick
BY
Willard D. Eakin
ATTORNEY May 15, 1945. T. L. FAWICK 2,375,909
CLUTCH
Filed May 21, 1941 2 Sheets-Sheet 2
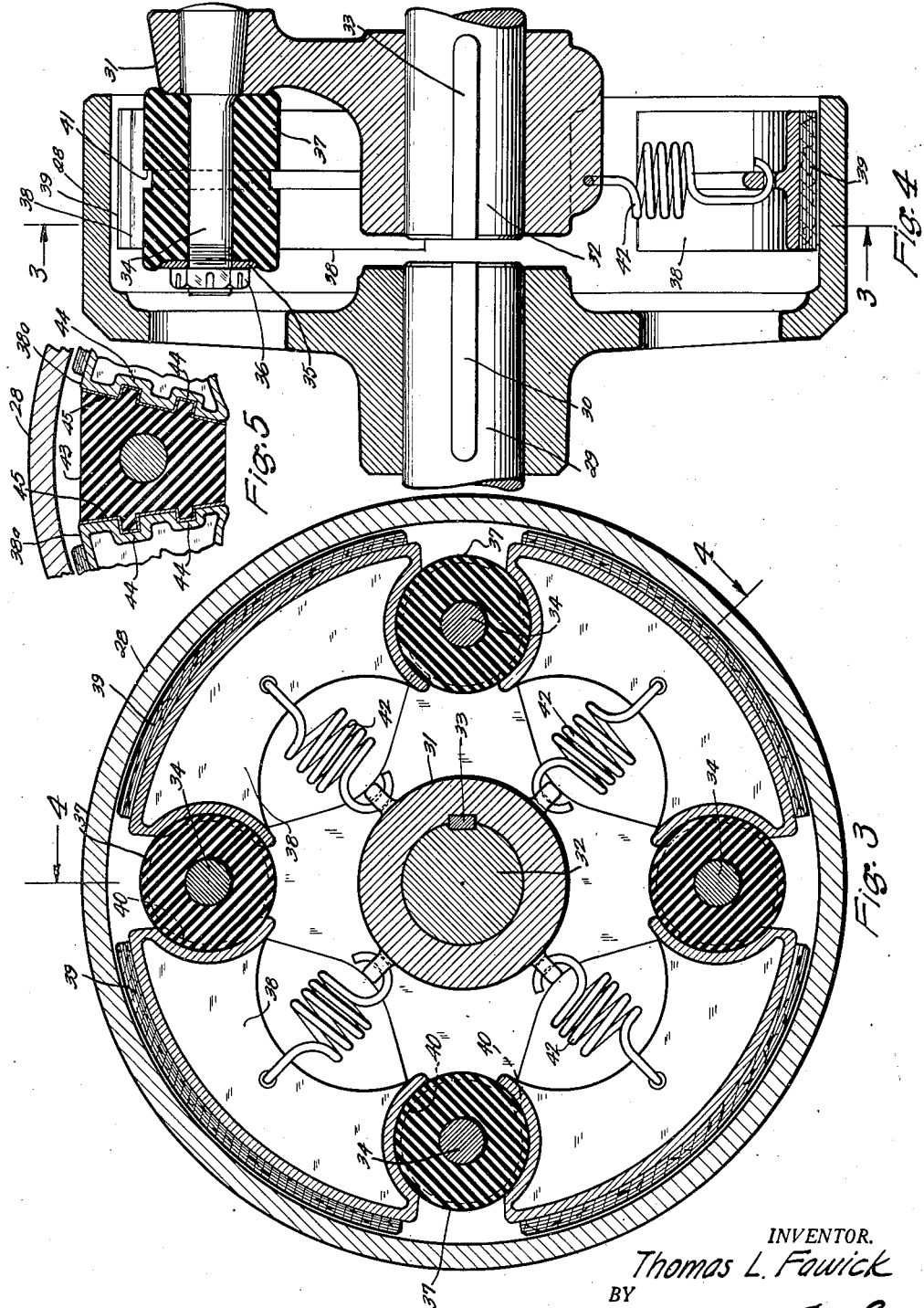
INVENTOR.
Thomas L. Fawick
BY
Willard D. Eakin
ATTORNEY Patented May 15, 1945

2,375,909

UNITED STATES PATENT OFFICE 2,375,909

CLUTCH

Thomas L. Fawick, Akron, Ohio

Application May 21, 1941, Serial No. 394,528

14 Claims. (Cl. 192—105)

This invention relates to clutches and especially to centrifugal clutches, although not wholly limited thereto.

Its chief objects are to provide simplicity and inexpensiveness of construction; to provide facility of assembly, disassembly and repair; to provide for desirable cushioning of the torque; to provide desirable flexible coupling characteristics; to provide ready adjustability for adapting the clutch to engage and disengage at determinate speeds; to provide adjustability as to the cushioning of the torque; and to provide a self-energizing effect.

Of the accompanying drawings:

Fig. 1 is a section, on line 1—1 of Fig. 2, of a centrifugal clutch embodying my invention in one of its preferred forms.

Fig. 2 is a section of the same on line 2—2 of Fig. 1.

Fig. 3 is a section, on line 3—3 of Fig. 4, of another clutch embodying my invention in another of its preferred forms.

Fig. 4 is a section on line 4—4 of Fig. 3.

Fig. 5 is a fragmentary section illustrating a modification of the clutch of Figs. 3 and 4.

Referring to the drawings, the clutch of Figs. 1 and 2 comprises a bell-shaped driven member 10 secured upon a driven shaft 11 having a straight key 12 and a clutch-hub 13 secured upon a driving shaft 14 having a straight key 15.

Secured upon the hub 13, as by cap-screws 16, 16, is a ring 17 formed with a circumferential series of bosses such as the boss 18, Fig. 2, each formed with an aperture in which is fitted the tapered head 19 of a stud bolt 20.

Mounted upon each of the stud bolts 20, and adapted to be clamped in an axial direction between the adjacent face of the boss 18 and a clamping washer 22 mounted upon the stud bolt, by the setting up of a nut 23, are two frusto-conical rubber bushings 24, 24, mounted upon the stud bolts with their smaller ends abutting each other, and within a complementally double-tapered hole formed in the hub of a centrifugal arm 25.

This construction is such that the rubber bushings 24, through which the torque is transmitted from the stud bolts 20 to the centrifugal arms 25, can be put under radial compression by the setting up of the nuts 23 and thus pre-loaded, to such degree as may be desired, for modifying the torque-cushioning effect of the rubber bushings.

This construction also is such that the rubber bushings, completely insulating the centriugal arms 25 from the ring 17, provide substantial flexible coupling effect in the clutch.

Each of the centrifugal arms 25 is formed with an arcuate outer face upon which is secured, as by rivets 26, 26, a wear shoe 27 adapted frictionally to engage the cylindrical inner face, 10ª, of the bell-shaped driven member 10, when the centrifugal arm is swung outward, about its stud bolt 20 as an axis, by rotation of the driving assembly, the deformability of the rubber bushings 24 permitting such swinging movement with only moderate resistance although the construction is such that the rubber bushings are capable of transmitting heavy torque, with only a desirable amount of cushioning of the torque, and with variation of their torque—cushioning effect, and of their resistance to outward movement of the arms 25, in accordance with the setting up of the nuts 23.

As the swing axes of the arms 25 are substantially closer to the axis of rotation than are the frictional engagement surfaces of the wear shoes, there is a substantial self-energizing effect when the direction of drive is counter-clockwise in the assembly as viewed in Fig. 1, and because of the deformability of the rubber bushings permitting the adjacent end portion of the wear shoe to be moved outward by centrifugal force the engagement pressure is not made highly non-uniform by the self-energizing feature.

For further, and independently adjustable, resistance to the outward swinging of the centrifugal arms 25, each of them has mounted in it near its outer end a stud bolt 28, extending toward the axis of rotation and provided with a spring-seat washer 29 and an adjusting nut 30, and a compression spring 31 is mounted between the spring-seat washer 29 and a spring seat 32 formed on and laterally projecting from the ring 17.

The embodiment shown in Figs. 3 and 4 comprises a bell-shaped driven member 28 secured upon a driven shaft 29 having a straight key 30 and a clutch-hub spider 31 secured upon a driving shaft 32 having a straight key 33.

A circumferential series of stud bolts 34, 34 having tapered heads are mounted in the arms of the spider-shaped clutch-hub 31 and each stud-bolt 34 is provided with a clamping washer 35 and a nut 36 for clamping in an axial direction, against the adjacent face of the spider arm, a rubber bushing member 37 and thereby putting it under transverse compression between adjacent members of a circumferential series of centrifugal members 38, 38 provided with respective friction facings or wear shoes 39, 39.

For keeping the centrifugal members 38 in alignment each is formed at each of its ends with a medial flange 40 fitting in a circumferential groove 41 (Fig. 4) formed in the rubber bushing.

The rubber bushings are sufficiently deformable to permit the small-amplitude outward movement of the members 38, under centrifugal force, for engagement of the clutch, and yet they are adapted to transmit, and provide desirable cushioning of, heavy torque. Their resilience is such as to provide for retraction of the members 38 for clutch disengagement at moderate speeds, but for higher speeds for engagement and disengagement the members 38 preferably are connected to the hub member 31 by respective pull springs 42, 42.

In this embodiment, as in the embodiment shown in Figs. 1 and 2, the effective modulus of the rubber bushings, for cushioning of torque and for resistance to centrifugal force, can be varied by the setting up or backing off of the clamping nuts after the parts have been assembled.

In this embodiment shown in Figs. 3 and 4 self-energizing is present as to either direction of drive, because the engagement faces of the shoes 39 are farther from the axis of rotation than are the bushing members 37.

In each of the embodiments also the operations of assembly and disassembly are very simple by reason of the accessibility of the clamping nuts and the ease of shifting the positions of the bell-shaped member or the clutch-hub on its straight-splined shaft.

In the fragmentary section shown in Fig. 5, illustrating a modification of the clutch shown in Figs. 3 and 4, a rubber member 43 of noncylindrical, inwardly tapered form is employed and is formed with interlocking-ribs 44, 44 occupying complemental grooves formed in the adjacent ends of the centrifugal members, 38ᵃ, 38ᵃ, and the rubber member preferably is provided with vulcanized-on metal facings 45, 45, this construction opposing to the centrifugal force a less localized resistance of the rubber to deformation.

Each of the embodiments provides some or all of the advantages set out in the above statement of objects, and other modifications are possible within the scope of the appended claims.

I claim:

1. A centrifugal clutch comprising a driving hub, a circumferential series of substantially rigid centrifugal members and, interposed between said hub and said members, a series of torque-transmitting bodies of resiliently deformable material, said bodies being adapted to yield under the centrifugal force of said rigid centrifugal members for clutch engagement and having their outer surfaces interlocked with them for transmission of torque and for resisting, in compression, radially outward movement of the adjacent portions of said members.

2. A centrifugal clutch comprising a driving hub, a circumferential series of substantially rigid centrifugal members and, interposed between said hub and said members, a series of pre-loaded torque-transmitting bodies of resiliently deformable material, said bodies being adapted to yield under the centrifugal force of said rigid centrifugal members for clutch engagement and having their outer surfaces interlocked with them for transmission of torque and for resisting, in compression, radially outward movement of the adjacent portions of said members.

3. A centrifugal clutch comprising a driving structure and a driven structure and, interposed operatively between the two, a series of substantially rigid centrifugal members and a series of pre-loaded torque-transmitting bodies of resiliently deformable material, said bodies being adapted to yield under the centrifugal force of said rigid centrifugal members for clutch engagement and having their outer surfaces interlocked with them for transmission of torque and for resisting, in compression, radially outward movement of the adjacent portions of said members, and each being mounted upon a central stud and being of approximately the same maximum radial depth in all planes that are axial with relation to the stud.

4. A centrifugal clutch comprising a driving structure and a driven structure and, interposed operatively between the two, a series of rigid centrifugal members and a series of pre-loaded torque-transmitting bodies of resiliently deformable material, said bodies being tapered in a direction parallel to the axis of rotation and preloaded by clamping pressure applied in that direction and being adapted to yield under the centrifugal force of said rigid centrifugal members for clutch engagement and having their outer faces interlocked with them for transmission of torque and for resisting, in compression, radially outward movement of the adjacent portions of said members.

5. A clutch comprising a clutch-hub, a circumferential series of frictional engagement members pivoted thereon, and torque-transmitting bodies of resiliently deformable material insulating adjacent portions of said members from said hub, said bodies being adapted to yield for outward movement of said members for clutch engagement and having their outer faces interlocked with said members for transmission of torque and for resisting, in compression, outward movement of the adjacent portions of said members.

6. A clutch comprising a clutch-hub, a circumferential series of frictional engagement members pivoted thereon and torque-transmitting bodies of resiliently deformable material insulating adjacent portions of said members from said hub and constituting their pivotal mountings, said bodies being adapted to yield for outward movement of said members for clutch engagement and having their outer faces interlocked with said members, for transmission of torque and for resisting, in compression, outward movement of the adjacent portions of said members.

7. A centrifugal clutch comprising a driving structure and a driven structure and, interposed operatively between the two, a series of centrifugal members and a series of torque-transmitting bodies of resiliently deformable material adapted to yield under the centrifugal force of said centrifugal members for clutch engagement and interlocked with said members for transmitting torque from one of said structures to the other, through the centrifugal members, by compressoin in the said bodies, the assembly including springs for resisting the centrifugal force of said centrifugal members.

8. A centrifugal clutch comprising a driving structure and a driven structure and, interposed operatively between the two, a series of centrifugal members and a series of torque-transmitting bodies of resiliently deformable material adapted to yield under the centrifugal force of said members for clutch engagement and interlocked with said members for transmitting torque from one of said structures to the other, through the centrifugal members, by compression in the said bodies, the assembly including springs for resisting the centrifugal force of said centrifugal members and means for adjusting said springs.

9. A clutch comprising a clutch-hub, a series of studs projecting therefrom in a direction parallel with the axis of rotation, torque-transmitting bushings of resiliently deformable material mounted respectively on said studs, and frictional-engagement members mounted respectively in non-slipping relation upon said bushings, each of said bushings being of approximately the same maximum radial depth in all planes that are axial with relation to the stud, and said frictional engagement members being adapted to shift, with relation to their respective studs, both radially and axially of the assembly but only by overcoming the yielding resistance of the bushings.

10. A clutch comprising a clutch-hub, a series of studs projecting therefrom in a direction parallel with the axis of rotation, torque-transmitting bushings of resiliently deformable material mounted respectively on said studs, frictional-engagement members mounted respectively upon said bushings, said bushings being adapted to yield for outward movement of said members for clutch engagement and having their outer faces interlocked with said members for transmission of torque and for resisting, in compression, outward movement of adjacent portions of said members, and means clamping said bushings in an axial direction and thereby maintaining them in a pre-loaded condition as to the transmission of torque.

11. A clutch comprising a clutch-hub, a series of studs projecting therefrom in a direction parallel with the axis of rotation, torque-transmitting bodies of resiliently deformable material mounted on said studs, and centrifugal members each mounted upon two of the said bodies.

12. A clutch comprising a clutch-hub, a series of studs projecting therefrom in a direction parallel with the axis of rotation, torque-transmitting bodies of resiliently deformable material mounted on said studs, and centrifugal members each mounted upon two of the said bodies, adjacent centrifugal members being spaced apart by and having radially interlocked relation to the intervening one of the said bodies.

13. A clutch comprising a clutch-hub, a series of studs projecting therefrom in a direction parallel with the axis of rotation, torque-transmitting bodies of resiliently deformable material mounted on said studs, and centrifugal members each mounted upon two of the said bodies, adjacent centrifugal members being spaced apart by and having radially interlocked relation to the intervening one of the said bodies, and the said bodies having metal facings adhered thereto.

14. A clutch comprising a clutch-hub, a circumferential series of stud members mounted thereon, a body of torque-transmitting and cushioning material mounted on each of said stud members and formed with interlocking projections, frictional engagement members interlocked with said projections, and a metal facing adhered to said projections.

THOMAS L. FAWICK.